Jan. 23, 1962 E. V. HIGBEE 3,017,908
UNIVERSAL SAW BLADE
Filed Aug. 20, 1959

INVENTOR.
EARL V. HIGBEE
BY
Lindsey and Prutzman
ATTORNEYS

United States Patent Office 3,017,908
Patented Jan. 23, 1962

3,017,908
UNIVERSAL SAW BLADE
Earl V. Higbee, New Britain, Conn., assignor to The Stanley Works, New Britain, Conn., a corporation of Connecticut
Filed Aug. 20, 1959, Ser. No. 835,024
2 Claims. (Cl. 143—133)

This invention relates to key hole saws and the like, and is concerned more particularly with a novel replacement saw blade for use in such saws which is adapted to be mounted in a variety of handles having different forms of blade attaching means.

It is customary in the trade to furnish key hole saws and the like with detachable blades so that when the blade is worn out or it is desired to use a blade of different tooth structure, only the blade and not the handle portion has to be replaced. Several types of handles and blade attaching means have been devised for this purpose, generally with the common characteristic of a forward extension or barrel on the handgrip defining a recess or slot into which the shank portion of the blade is secured. Various retaining means are employed to secure the blade in the blade holder which require the presence of configured slots or apertures in the blade depending upon the particular type of handle and holder assembly. Heretofore, saw blade manufacturers have manufactured blades individually designed for use in each of these several types of holders and which are not always interchangeable with each other, and dealers have been required to maintain a large stock of the various blades in order to adequately supply their customers with a blade of the precise configuration required.

It is the object of this invention to provide a novel saw blade which is suitable for use in a large proportion of commercially available handles and holders including those utilizing either T-bolts or transverse pins as the fastening means, and which are economically produced and easily adaptable by the purchaser for use in holders of various designs.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
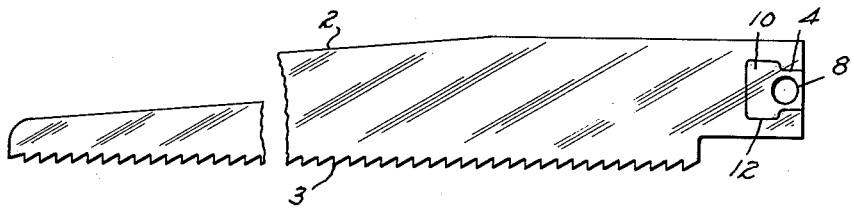
FIG. 1 is a fragmentary side view of a saw blade embodying the invention.
Figure 2:
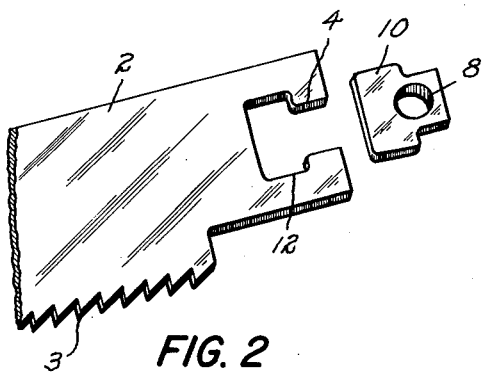
FIG. 2 is an exploded perspective view of the shank end of the saw blade with the knock-out piece separated therefrom.

Referring first to FIGS. 1 and 2 which show a saw blade embodying the present invention, it will be noted that the saw blade is formed in the usual manner of a hardened strip 2 of sheet metal which tapers or diminishes in width from the shank end to the tip, one edge 3 being formed with saw teeth in the usual manner. The shank end is notched as indicated at 4 and dimensioned so that it may be inserted into the slotted holder provided on most commercially available handles.

The saw blade is provided with a circular aperture or hole 8 adjacent but spaced from the rear edge of the blade and midway between the side edges of the shank portion. The hole 8 is situated in the throat portion of a removable knock-out piece 10 which is T-shaped in configuration. The T-shaped knock-out piece 10 which, when removed, provides the T-shape aperture 12 is intended to be firmly seated or wedged in the aperture 12 so that it will not be dislodged therefrom under normal conditions of usage but can be removed by striking it in a direction transverse to the axis of the saw blade by means of a punch or similar striking tool. One method of providing a knock-out piece having these characteristics is to punch the piece from the strip of metal with a conventional punching tool and thereafter press the punched-out piece back into the recess.

As a result of the foregoing structure, either the aperture 8 or the aperture 12 of the blade may be used selectively to secure or fasten the blade in most of the holders now available. As shown in FIG. 1 with the knock-out piece 10 in place, the blade is provided with the centrally disposed hole 8 for accommodating a pin, and as illustrated in FIG. 2, when the knock-out piece 10 has been separated from the blade, there is provided the longitudinally extending slot 12 of T-shape configuration at the rear end of the blade which may be used to accommodate a positioning piece such as a T-shaped connector, either of which may be used in commercially available holders.

Figure 3:
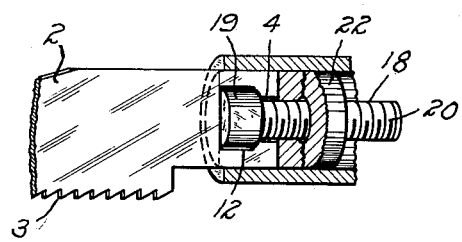
FIG. 3 is an enlarged fragmentary side view of the end of the blade as mounted in one form of blade holder, the holder being shown in cross section.
Figure 4:
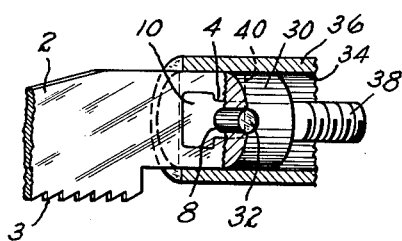
FIG. 4 is a view similar to FIG. 3 showing the blade disposed in another type of holder.

Illustrative of various mounting arrangements in which the universal saw blade of the present invention may be employed are those shown in FIGS. 3 and 4.

In FIG. 3 the T-shaped knock-out piece 10 has been removed from the end of the blade and the head 19 of a T-lug or T-bolt 18 has been engaged in the T-slot 12. In this type of holder the threaded shank 20 or stem of T-lug 18 is drawn inwardly by means of a threaded adjusting knob (not shown) whereby the blade shank is drawn into a slot in the clamping member 22.

In FIG. 4 the knock-out piece 10 has not been removed, and the shank of the blade is inserted into the slot between the jaws of the clamping member 30 and engaged therein by the pin 32 which extends through the aperture 8 in the knock-out piece 10. The clamping member 30 is similarly drawn into the recess 34 of the barrel 36 by rotation of an adjusting nut (not shown) on the bolt stem 38 until the shoulder of the notch 4 abuts the edge 40 of the barrel 36.

It is readily apparent from the foregoing description and drawings that the novel saw blade of the present invention is one which may be employed in various types of holders, thus providing a "universal saw blade." The knock-out piece is readily and economically produced during the fabricating operation and may be retained in place to provide the rear fastening hole 8 if desired, or it may be easily removed by the purchaser to provide a slotted shank for reception of a T-shaped connector or other positioning means.

Although only a single embodiment has been illustrated and described, it is readily apparent to those skilled in the art that modifications may be made without departing from the scope and spirit of the invention.

I claim:

1. A replaceable saw blade for mounting in different types of holders for saws of the reciprocating type comprising a saw blade formed of sheet metal and having a shank portion at the rear thereof, an irregularly shaped knock-out piece in said sheet extending inwardly from the rear edge thereof and having a transversely enlarged portion spaced inwardly of the rear edge, said knock-out piece being defined by a severance line in said sheet and upon removal providing an irregularly shaped slot opening at the rear edge of the blade and of the same configuration as the knock-out piece, the cooperating walls of said slot and said knock-out piece being in tight-fitting engagement throughout to normally retain said knock-out piece against inadvertent disassembly and to permit detachment by movement of the knock-out piece transversely of the blade axis, said knock-out piece having an aperture therein spaced inwardly of the rear edge of the blade, whereby the blade may be secured selectively in a holder both by a headed member engaged in the enlarged portion of the slot formed by removing the knock-out piece and by a member extending transversely through the aperture in the unremoved knock-out piece.

2. A replaceable saw blade in accordance with claim 1 wherein said knock-out piece is of T-shaped configuration and provides a T-slot opening on the rear edge of the blade upon removal.

References Cited in the file of this patent

UNITED STATES PATENTS

| | | |
|---|---|---|
| 2,572,042 | Martin | Oct. 23, 1951 |
| 2,696,233 | Huxtable | Dec. 7, 1954 |
| 2,773,528 | Gringer | Dec. 11, 1956 |
| 2,778,395 | Forsberg | Jan. 22, 1957 |
| 2,822,648 | Metzger et al. | Feb. 11, 1958 |
| 2,912,021 | Gommel | Nov. 10, 1959 |